US011558734B2

United States Patent
Crespo et al.

(10) Patent No.: US 11,558,734 B2
(45) Date of Patent: Jan. 17, 2023

(54) WIRELESS COMMUNICATION DEVICE AND METHOD

(71) Applicant: STMicroelectronics (Rousset) SAS, Rousset (FR)

(72) Inventors: Thierry Crespo, Trets (FR); Pierre Rizzo, Trets (FR); Alexandre Tramoni, Le Beausset (FR); Patrice Portefaix, Saint-Maximin-la-Sainte-Baume (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 17/317,401

(22) Filed: May 11, 2021

(65) Prior Publication Data

US 2021/0360388 A1 Nov. 18, 2021

(30) Foreign Application Priority Data

May 14, 2020 (FR) ...................................... 2004770

(51) Int. Cl.
*H04W 8/22* (2009.01)
*G06K 19/077* (2006.01)

(52) U.S. Cl.
CPC .......... *H04W 8/22* (2013.01); *G06K 19/0772* (2013.01)

(58) Field of Classification Search
USPC ....................................................... 455/558
See application file for complete search history.

(56) References Cited

U.S. PATENT DOCUMENTS

| 8,364,203 | B2 | 1/2013 | Morel et al. |
| 8,532,572 | B2 * | 9/2013 | Renard ............... G06Q 20/3227 455/41.1 |
| 8,615,196 | B2 * | 12/2013 | Chen ..................... G07F 7/0873 713/192 |
| 9,100,393 | B2 * | 8/2015 | Schell ...................... G06F 21/34 |
| 9,374,697 | B2 | 6/2016 | Shih et al. |
| 9,609,458 | B2 * | 3/2017 | Ramanna ............... H04W 8/205 |
| 9,843,885 | B2 * | 12/2017 | Yerrabommanahalli ..................... H04W 8/205 |
| 10,431,630 | B2 | 10/2019 | Boivin et al. |
| 10,645,569 | B2 * | 5/2020 | Salmela ................ H04W 8/205 |
| 10,764,745 | B2 * | 9/2020 | Li .......................... H04W 12/40 |
| 11,039,299 | B2 * | 6/2021 | Gui ......................... H04W 4/80 |
| 11,212,674 | B2 * | 12/2021 | Park ..................... H04W 12/47 |

(Continued)

FOREIGN PATENT DOCUMENTS

| EP | 2172877 A1 | 4/2010 |
| WO | 2010105458 A1 | 9/2010 |

OTHER PUBLICATIONS

Sheather, S., et al., "A reliable Data-Based Bandwidth Selection Method for Kernel Density Estimation", J. Royal Statistics Soc. B, vol. 53, Issue 3, Jan. 1, 1991, 9 pages.

*Primary Examiner* — Hai V Nguyen
(74) *Attorney, Agent, or Firm* — Slater Matsil, LLP

(57) ABSTRACT

An embodiment subscriber identification module includes a first communication interface, including first pads intended to be coupled to a modulator-demodulator circuit; a second interface, including second pads intended to be coupled to a subscriber identification module card; and a switching circuit, configured to couple the first pads to the second pads or to a communication module integrated to the subscriber identification module. Another embodiment concerns a method of controlling the module.

20 Claims, 5 Drawing Sheets

(56) References Cited

U.S. PATENT DOCUMENTS

| | | | |
|---|---|---|---|
| 2005/0032550 A1* | 2/2005 | Baratono | H04M 1/21 |
| | | | 455/558 |
| 2008/0081611 A1* | 4/2008 | Hoyt | H04W 12/0471 |
| | | | 455/425 |
| 2008/0144650 A1* | 6/2008 | Boch | G06K 7/10297 |
| | | | 370/464 |
| 2009/0207042 A1* | 8/2009 | Park | H04L 43/08 |
| | | | 340/870.02 |
| 2012/0117635 A1* | 5/2012 | Schell | G06F 21/34 |
| | | | 726/5 |
| 2012/0176237 A1* | 7/2012 | Tabe | A61B 5/6804 |
| | | | 340/539.12 |
| 2012/0295614 A1* | 11/2012 | Sherman | H04B 1/3816 |
| | | | 455/426.1 |
| 2014/0012414 A1* | 1/2014 | Perez | G07F 9/001 |
| | | | 700/241 |
| 2014/0323045 A1* | 10/2014 | Brahami | G06Q 20/3278 |
| | | | 455/41.1 |
| 2015/0170016 A1* | 6/2015 | Avagliano | G07F 7/0833 |
| | | | 705/41 |
| 2015/0325124 A1* | 11/2015 | Fernback | G08G 1/096775 |
| | | | 340/905 |
| 2016/0080039 A1* | 3/2016 | Brahami | H04B 5/0031 |
| | | | 455/41.1 |
| 2016/0094930 A1* | 3/2016 | Ramanna | H04B 1/3816 |
| | | | 455/558 |
| 2017/0057461 A1* | 3/2017 | Gaskin | G08B 21/0269 |
| 2019/0200199 A1* | 6/2019 | Faerber | H01M 10/4257 |
| 2019/0357044 A1* | 11/2019 | Park | G06F 13/4282 |
| 2022/0159453 A1* | 5/2022 | Zhang | H04W 76/11 |

\* cited by examiner

WIRELESS COMMUNICATION DEVICE AND METHOD

CROSS-REFERENCE TO RELATED APPLICATIONS

This application claims priority to French Patent Application No. 2004770, filed on May 14, 2020, which application is hereby incorporated herein by reference.

TECHNICAL FIELD

The present disclosure generally concerns electronic devices and methods, and, more particularly, wireless communication devices and methods using subscriber identity module (SIM) cards.

BACKGROUND

Many electronic devices, for example, cell phones, each comprising one or a plurality of locations intended to receive a subscriber identification module card, or SIM card, are known. Each SIM card of a device generally enables it to connect to a mobile telephony network and to exchange data with other devices via this network.

Among devices comprising one or a plurality of locations intended to each receive a SIM card, certain devices further comprise an embedded subscriber identity module (eSIM). However, the integration of embedded subscriber identity modules in such devices is generally done to the detriment of the number of locations intended to receive a SIM card. This accordingly adversely affects the flexibility of use of such devices.

SUMMARY

There is a need to improve devices comprises a subscriber identification module and at least one SIM card.

An embodiment overcomes all or part of the disadvantages of known devices comprising an embedded subscriber identification modules and at least one SIM card.

An embodiment provides a subscriber identification module comprising: a first communication interface, comprising first pads intended to be coupled to a modulator-demodulator circuit; a second communication interface, comprising second pads intended to be coupled to a subscriber identification module card; and a switching circuit, configured to couple the first pads to the second pads or to a communication module integrated to the subscriber identification module.

An embodiment provides a method of controlling a subscriber identification module, comprising a first communication interface, comprising first pads intended to be coupled to a modulator-demodulator circuit, and a second communication interface, comprising second pads intended to be coupled to a subscriber identification module card, wherein the first pads are coupled, by a switching circuit, to the second pads or to a communication module integrated to the subscriber identification module.

According to an embodiment, the subscriber identification module further comprises a non-volatile memory, the switching circuit being controlled according to the state of a bit of a register of the memory.

According to an embodiment, the switching circuit comprises an analysis and routing module, configured to analyze and redirect signals received by the first communication interface of the subscriber identification module.

According to an embodiment, each of the first and second interfaces is selected from among: a standardized ISO 7816 interface; an I2C interface; an I3C interface; and an SPI series interface.

An embodiment provides an electronic device comprising: a subscriber identification module such as described; a modulator-demodulator circuit; and a first location intended to receive a first subscriber identification module card.

According to an embodiment, the subscriber identification module is an embedded subscriber identification module.

According to an embodiment, the subscriber identification module forms part of a near-field communication module of the device.

According to an embodiment, the subscriber identification module is integrated to a secure module of the near-field communication module of the device.

According to an embodiment, the device further comprises a microprocessor of system-on-chip type, the subscriber identification module being integrated to the microprocessor.

According to an embodiment: the modulator-demodulator circuit comprises a third communication interface comprising third pads coupled to the first pads of the first communication interface of the subscriber identification module; and the first location comprises a fourth communication interface, comprising fourth pads coupled to the second pads of the second communication interface of the subscriber identification module.

According to an embodiment, the modulator-demodulator circuit further comprises a fifth communication interface, comprising fifth pads coupled to sixth pads of a sixth communication interface of a second location intended to receive a second subscriber identification module card.

BRIEF DESCRIPTION OF THE DRAWINGS

The foregoing and other features and advantages of the present invention will be discussed in detail in the following non-limiting description of specific embodiments and implementation modes in connection with the accompanying drawings, in which.

DETAILED DESCRIPTION OF ILLUSTRATIVE EMBODIMENTS

Figure 1:
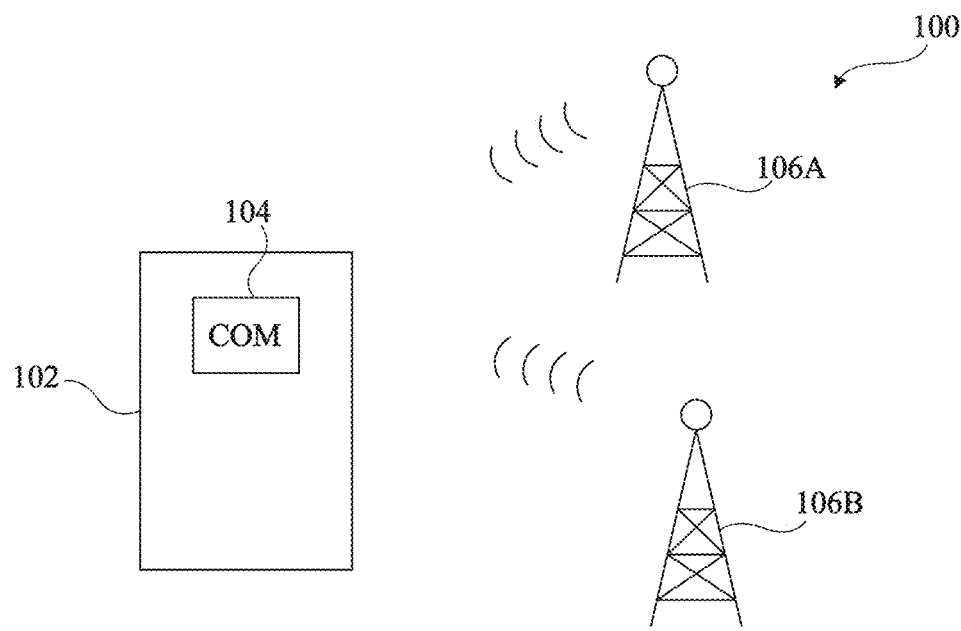
FIG. 1 schematically shows in the form of blocks an example of a radio frequency communication system of the type to which the described embodiments and implementation modes apply as an example.

Like features have been designated by like references in the various figures. In particular, the structural and/or functional elements common to the different embodiments and implementation modes may be designated with the same reference numerals and may have identical structural, dimensional, and material properties.

For clarity, only those steps and elements which are useful to the understanding of the described embodiments and implementation modes have been shown and will be detailed. In particular, the generation of the radio frequency signals and the interpretation thereof have not been detailed, the described embodiments and implementation modes being compatible with usual techniques of generation and interpretation of such signals.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

Unless specified otherwise, the expressions "around", "approximately", "substantially" and "in the order of" signify within 10%, and preferably within 5%.

FIG. 1 schematically shows in the form of blocks an example of a radio frequency communication system 100 of the type to which the described embodiments and implementation modes apply as an example.

In the shown example, system wo comprises a device 102 capable of implementing radio frequency communications. It is arbitrarily considered in the following description that device 102 is a cell phone. This is however not limiting and device 102 may as a variant for example be a touch pad, a smart watch, a connected bracelet, a connected vehicle, or more generally any type of connected object.

Cell phone 102 comprises a radio frequency switching circuit symbolized, in FIG. 1, by a block 104 (COM). Radio frequency switch circuit 104 for example enables cell phone 102 to exchange data with antennas 106A and 106B. According, for example, to the functionalities of circuit 104, the communication between cell phone 102 and antennas 106A and 106B is performed in alternation, cell phone 102 then only being capable of exchanging data with a single antenna 106A, 106B at a time, or simultaneously, cell phone 102 being then capable of exchanging data with both antennas 106A and 106B at the same time.

As an example, antennas 106A and 106B of system 100 each form part of a different mobile telephony infrastructure. Such infrastructures are for example each operated by a different telephone operator. This for example enables cell phone 102 to emit and receive telephone calls, messages, and/or data by using a first mobile telephony network, made available by the operator using antenna 106A, and/or a second mobile telephony network, made available by the other operator using antenna 106B.

Generally, the mobile telephony infrastructures respectively comprising antennas 106A and 106B for example enable device 102 to communicate with other devices (not shown).

Figure 2:
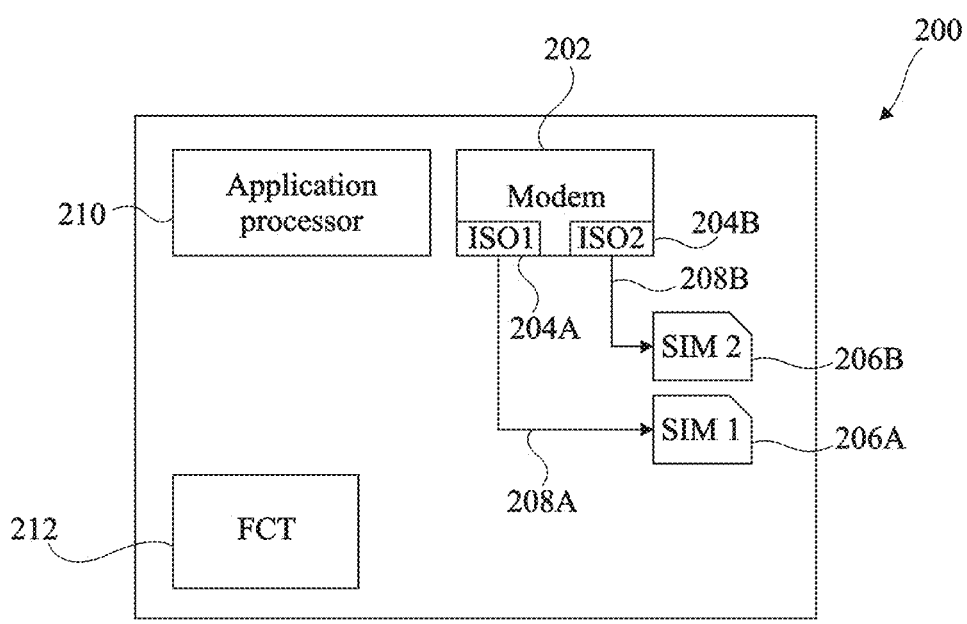
FIG. 2 schematically shows in the form of blocks an example of an electronic radio frequency communication device.

FIG. 2 schematically shows in the form of blocks an example of a radio frequency communication electronic device 200. Device 200 for example corresponds to the device 102 of FIG. 1.

In the shown example, device 200 comprises a modulator-demodulator circuit or modem 202 (Modem). Modem 202 for example has two communication interfaces 204A (ISO1) and 204B (ISO2) as illustrated in FIG. 2.

Each communication interface 204A, 204B of device 200 is coupled to a subscriber identity module card 206A (SIM 1), 206B (SIM 2) or SIM card. More particularly, in the example illustrated in FIG. 2, communication interfaces 204A and 204B are respectively connected, by links 208A and 208B, to SIM cards 206A and 206B.

SIM cards 206A and 206B are, in the example of FIG. 2, physical SIM cards, typically removable universal integrated circuit cards (UICC). In practice, SIM cards 206A and 206B are generally each inserted into a location or housing (not shown) of device 200. According, in particular, to the dimensions of the locations of device 200 intended to receive SIM cards 206A and 206B, the SIM cards are for example at the "Mini SIM" (2FF), "Micro SIM" (3FF), or "Nano SIM" (4FF) format.

Each SIM card 206A, 206B generally contains information specific to a contract or subscription subscribed by a subscriber by an operator or access provider (for example, a mobile telephony network operator or an Internet access provider). The information takes the shape, for example, of a country code, of an identifier specific to the operator, and of an identifier specific to the subscriber.

In the shown example, device 200 further comprises a microprocessor 210 (Application processor). Microprocessor 210 is for example a main microprocessor of device 200. As an example, microprocessor 210 is integrated to an architecture of system-on-chip (SoC) type. Microprocessor 210 executes, for example, program code instructions enabling different components or peripherals of device 200 to operate.

Device 200 may comprise other circuits. These circuits are, in FIG. 2, symbolized by a block 212 (FCT).

Figure 3:
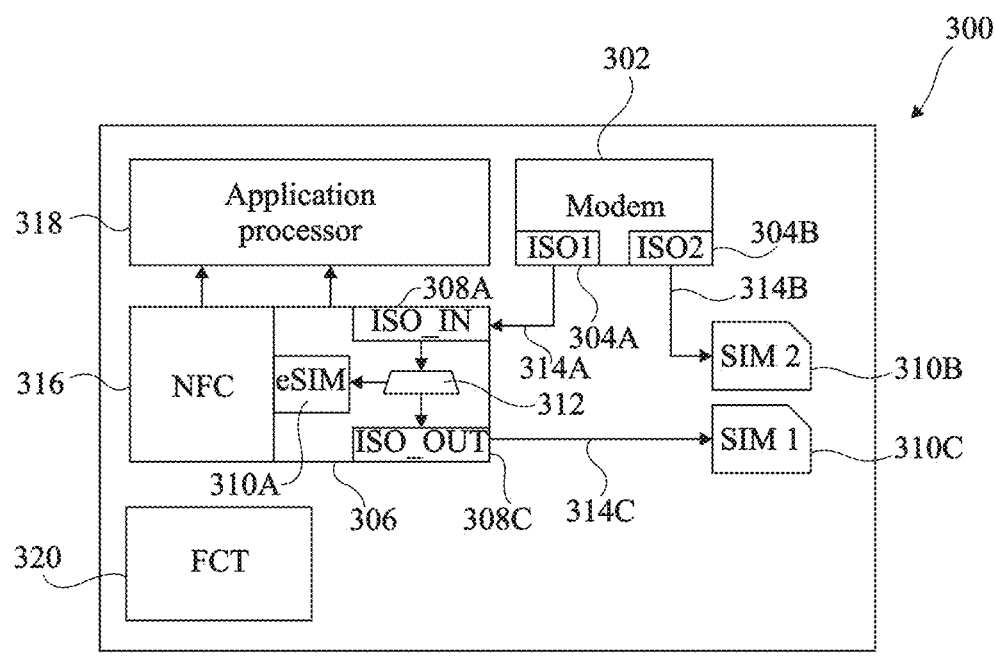
FIG. 3 schematically shows in the form of blocks an embodiment of a radio frequency electronic communication device comprising an embedded subscriber identification module.

FIG. 3 schematically shows in the form of blocks an embodiment of an electronic radio frequency communication device 300.

The device 300 of FIG. 3 comprises a modulator-demodulator circuit 302 (Modem), or modem. The modem 302 of device 300 is for example similar to the modem 202 of the device 200 previously described in relation with FIG. 2. In the shown example, modem 302 comprises interfaces 304A (ISO1) and 304B (ISO2). Interfaces 304A and 304B of modem 302 are for example respectively similar to interfaces 204A and 204B of modem 202.

According to this embodiment, device 300 further comprises an embedded subscriber identification module 306 (eSIM). In the shown example, the embedded subscriber identification module 306 of device 300 comprises a first communication interface 308A (ISO_IN) coupled, preferably connected, to modulator-demodulator circuit 302; and a second communication interface 308C (ISO_OUT) coupled, preferably connected, to a first SIM card 310C (SIM 1); a communication module 310A (eSIM); and a switching circuit 312.

In the shown example, interface 304A of modem 302 is connected, by a link 314A, to the first interface 308A of module 306; interface 304B of modem 302 is connected, by a link 314B, to a second SIM card 310B (SIM 2); and the second interface 308C of module 306 is connected, by a link 314C, to SIM card 310C.

More particularly, pads (not shown) of interface 304A are connected, by link 314A, to pads (not shown) of first interface 308A. Similarly, pads (not shown) of interface 304B are connected, by link 314B, to pads (not shown) of a location (not shown) intended to receive SIM card 310B. Further, pads (not shown) of second interface 308C are connected, by link 314C, to pads (not shown) of a location (not shown) intended to receive SIM card 310C.

In the following description, it is arbitrarily considered that interfaces 304A, 304B, 308A, and 308C are standardized ISO/IEC 7816 interfaces, and that links 314A, 314B, and 314C are standardized ISO/IEC 7816 links. The terms standardized ISO/IEC 7816 interfaces and links designate interfaces and communication links complying with the requirements of the ISO/IEC 7816 standard, for example, complying with the requirements of part 3 of the ISO/IEC 7816 standard in its 2006 version (ISO/IEC 7816-3:2006 Contacts cards-Electric interface and transmission protocols). As used herein, compliance with a standard includes compliance with any standard in effect at the effective filing date of this document.

The described embodiments and implementation modes may however be transposed by those skilled in the art to other types of selected interfaces and links, for example, among I2C interfaces and links; I3C interfaces and links; and SPI series interfaces and links.

The SIM cards 310B and 310C of device 300 are for example similar to the SIM cards 206B and 206A of device 200 (FIG. 2).

According to an embodiment, embedded subscriber identification module 306 forms part of a near-field communication module 316 (NFC). Module 316 enables device 300 to communicate, for example, with another device (not shown) similar to device 300, by near-field electromagnetic coupling.

Embedded subscriber identification module 306 is for example, integrated to a secure element (not shown), for example, an embedded secure element (eSE) associated with or coupled to near-field communication module 316. In practice, near-field communication module 316 and the secure element integrating embedded subscriber identification module 306 may form part of a same electronic chip.

The secure element is for example an electronic component configured to store and/or process all or part of so-called secret data, the access to which is desired to be reserved to certain users or circuits. As an example, the secure element implements one or a plurality of cipher algorithms and stores one or a plurality of secret keys used by the algorithm(s) during data cipher operations.

In the shown example, modules 306 and 316 are coupled or connected to a microprocessor 318 (Application processor) of device 300. The microprocessor 318 of device 300 is for example similar to the microprocessor 210 of device 200 previously described in relation with FIG. 2.

In practice, subscriber identification module 306 is for example a physical module, intended to be welded to a printed circuit board; or a software subscriber identity module (soft SIM) executed by a circuit of device 300.

Communication module 310A is for example a module capable of interpreting signals transmitted by modem 302 and of generating signals to be transmitted to modem 302. More generally, module 310A is for example programmed to have functionalities similar to those of SIM card 310B or of SIM card 310C.

In operation, embedded subscriber identification module 306 exchanges signals with modem 302 over link 314A. Switching circuit 312 then particularly enables to direct the signals towards SIM card 310C or towards communication module 310A, integrated to embedded subscriber identification module 306.

An advantage of the device 300 discussed in relation with FIG. 3 lies in the fact that it enables to use either both physical SIM cards 310B and 310C, or communication module 310A and physical SIM card 310B. This thus provides a greater flexibility of use to device 300 as compared, in particular, with the device 200 of FIG. 2 where only the use of the two physical SIM cards 206A and 206B is possible. Indeed, the presence of switching circuit 312 in device 300 provides the possibility of choosing to use module 310A and SIM card 310B (where SIM card 310C and the associated location may, in this case, be omitted), or to only use SIM cards 310B and 310C, that is, to come down to an operation similar to that of the device 200 of FIG. 2. This choice is for example made by the manufacturer of device 300 during a factory setting.

Another advantage of device 300 lies in the fact that switching circuit 312, selectively enabling to direct the communications with modem 302 either towards module 310A, or towards SIM card 310, is internal to embedded subscriber identification module 306. This allows a decrease in the cost, the dimensions, and the complexity of device 300, particularly as compared with a device which would have, for example, a switching circuit external to embedded subscriber identification module 306.

Device 300 may comprise other circuits. These circuits are, in FIG. 3, symbolized by a block 320 (FCT).

Figure 4:
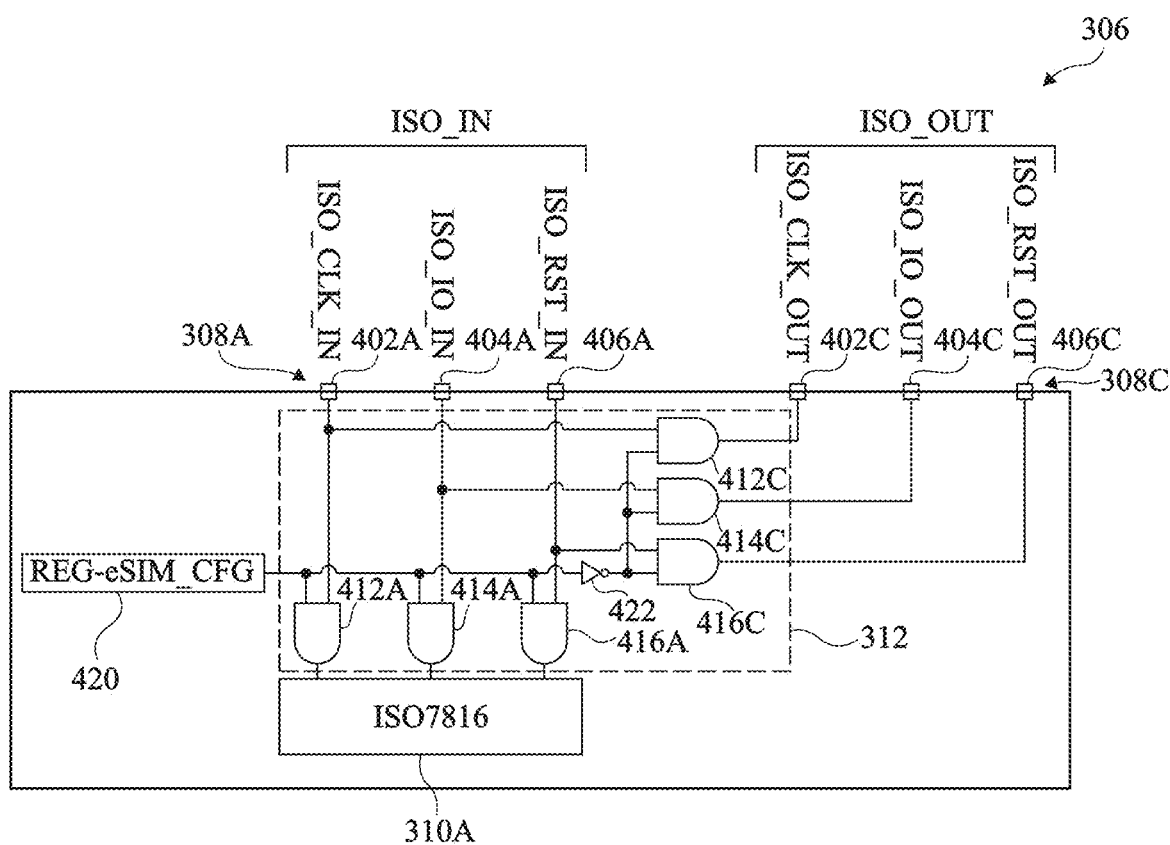
FIG. 4 schematically and partially shows an embodiment of the embedded subscriber identification module of the device of FIG. 3.

FIG. 4 schematically and partially shows an embodiment of the embedded subscriber identification module 306 of the device 300 of FIG. 3.

According to this embodiment, the first interface 308A (ISO_IN) of embedded subscriber identification module 306 comprises a pad 402A (ISO_CLK_IN), capable of receiving a synchronization signal, or clock signal; another pad 404A (ISO_IO_IN), capable of exchanging data signals with modem 302 (FIG. 3); and still another pad 406A (ISO_RST_IN) capable of receiving a reset signal.

Similarly, the second interface 308C (ISO_OUT) of embedded subscriber identification module 306 comprises a pad 402C (ISO_CLK_OUT), capable of receiving a synchronization signal, or clock signal; another pad 404C (ISO_IO_OUT), capable of exchanging data signals with SIM card 310C (FIG. 3); and still another pad 406C (ISO_RST_OUT), capable of transmitting a reset signal.

The pads 402A, 404A, and 406A of first interface 308A are intended to be coupled, preferably connected, to pads (not shown) of modem 302 (FIG. 3). The pads 402C, 404C, and 406C of second interface 308C are intended to be coupled, preferably connected, to pads (not shown) of a housing or location (not shown) intended to receive SIM card 310C (FIG. 3).

In the shown example, switching circuit 312 comprises a logic AND gate 412A having an input coupled, preferably connected, to terminal 402A; a logic AND gate 414A having an input coupled, preferably connected, to terminal 404A; a logic AND gate 416A having an input coupled, preferably connected, to terminal 406A; a logic AND gate 412C, having an input coupled, preferably connected, to terminal 402A; a logic AND gate 414C, having an input coupled, preferably connected, to terminal 404A; and a logic AND gate 416C, having an input coupled, preferably connected, to terminal 406A.

The other input of each logic gate 412A, 414A, 416A receives, for example, a binary signal which is an image of the state of a bit noted eSIM_CFG. Bit eSIM_CFG is for example a bit of configuration of switching circuit 312. In the shown example, bit eSIM_CFG is stored in a state register of a memory 420 (REG-eSIM_CFG) of embedded subscriber identification module 306. Memory 420 is for example a non-volatile memory. This thus particularly enables to store the state of bit eSIM_CFG when device 300 is powered off.

However, the other input of each logic gate 412C, 414C, 516C receives, for example, a binary signal which is an image of the inverse of the state of bit eSIM_CFG. In the shown example, the binary signal transmitted to logic gates 412A, 414A, and 416A is inverted, by an inverter 422, before being transmitted to logic gates 412C, 414C, and 416C. This enables to use a single binary signal to control the state, on or off, of logic gates 412A, 414A, and 416A and of logic gates 412C, 414C, and 416C, respectively.

In the shown example, if bit eSIM_CFG is in the high state, logic gates 412A, 414A, and 416A are then conductive while logic gates 412C, 414C, and 416C are blocked, which results in coupling pads 402A, 404A, and 406A to module 310A (ISO7816). However, if the bit of state register 420 is in the low state, logic gates 412A, 414A, and 416A then are blocked while logic gates 412C, 414C, and 416C are conductive, which results in coupling pads 402A, 404A, and 406A to pads 402C, 404C, and 406C, respectively.

More generally, when bit eSIM_CFG is in the high state, the physical link between modem 302 (FIG. 3) and module 310A is established, while the physical link between modem 302 and SIM card 310C (FIG. 3) is interrupted. This for example corresponds to a situation where it is desired to communicate by using module 310A and where SIM card 310C is not desired to be used.

Conversely, when bit eSIM_CFG is in the low state, the physical link between modem 302 (FIG. 3) and module 310A is interrupted, while the physical link between modem 302 and SIM card 310C (FIG. 3) is established. This for example corresponds to a situation where it is desired to communicate by using SIM card 310C and where module 310A is not desired to be used.

The value of bit eSIM_CFG is, for example, configured to the low or high state according to whether device 300 (FIG. 3) is equipped with or deprived of a housing capable of receiving SIM card 310C. Module 306 may thus advantageously be used in different types of devices, for example, in devices equipped or not with a housing intended to receive SIM card 310C. A better flexibility of use is thus obtained.

Figure 5:
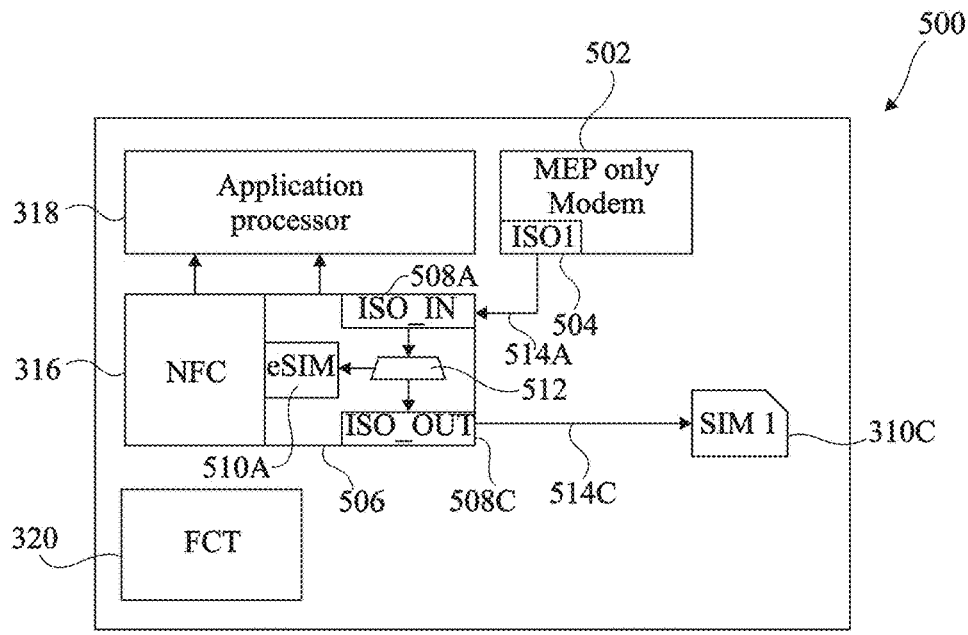
FIG. 5 schematically shows in the form of blocks another embodiment of an electronic radio frequency communication device comprising an embedded subscriber identification module.

FIG. 5 very schematically shows in the form of blocks another embodiment of an electronic radio frequency communication device 500. The device 500 of FIG. 5 comprises elements common with the device 300 of FIG. 3. Such common elements will not be detailed again hereafter.

As compared with the device 300 of FIG. 3, the device 500 of FIG. 5 comprises, instead of modem 302, another modulator-demodulator circuit 502 (MEP only Modem), or modem. Modem 502 is for example capable of encoding, over a same link, communications corresponding to a plurality of subscriber identification profiles. Modem 502 is for example a so-called multiple enable profile (MEP) modem.

In the shown example, modem 502 has an interface 504 (ISO1). The interface 504 of modem 502 is for example similar to the interface 304A of modem 302 (FIG. 3).

According to this embodiment, device 500 further comprises an embedded subscriber identification module 506 (eSIM). In the shown example, the embedded subscriber identification module 506 of device 500 comprises a first communication interface 508A (ISO_IN) coupled, preferably connected, to modem 502; and a second communication interface 508C (ISO_OUT) coupled, preferably connected, to SIM card 310C (SIM 1); a communication module 510A (eSIM); and a switching circuit 512.

Interface 508A, interface 508C, communication module 510A, and switching circuit 512 of device 500 are, for example, respectively similar to interface 308A, to interface 308C, to module 310A, and to the circuit 312 of the device 300 previously described in relation with FIG. 3.

In the shown example, the first communication interface 508A of embedded subscriber identification module 506 is connected, by a link 514A, to the interface 504 of modem 502; and the second communication interface 508B of embedded subscriber identification module 506 is connected, by a link 514C, to SIM card 310C.

The communication module 510A of device 500 gathers, for example, functionalities similar to those of a plurality of SIM cards. As an example, this enables module 510A to have functionalities similar to those of both module 310A (FIG. 3) and SIM card 310B (FIG. 3). In other words, two subscriber identification profiles are for example programmed in module 510A.

An advantage of the device 500 discussed in relation with FIG. 5 lies in the fact that it jointly enables to use the physical SIM card 310C and communication module 510A, where a plurality of subscriber identification profiles are programmed. This thus provides a greater flexibility of use to device 500 with respect, in particular, to a device where only the use of physical SIM card 310C would be possible. Indeed, the presence of switching circuit 512 in device 500 provides the possibility of using, in addition to SIM card 310C, module 510A to have more subscriber identification profiles, or SIM profiles.

In a case where the location (not shown) intended to receive SIM card 310C is not used, embedded subscriber identification module 506 may, similarly to what has been previously discussed in relation with FIG. 4, be parameterized to direct all communications towards communication module 510.

Figure 6:
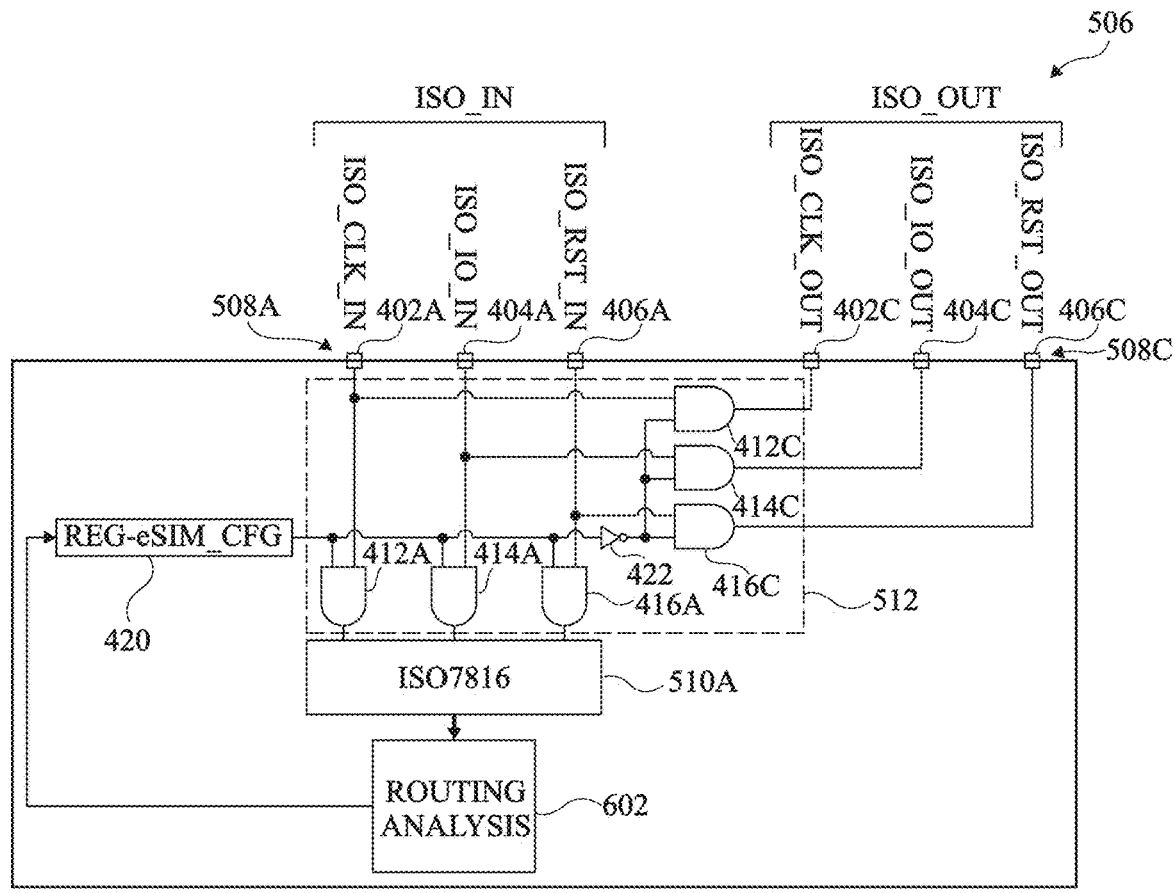
FIG. 6 schematically and partially shows an embodiment of the embedded subscriber identification module of the device of FIG. 5.

FIG. 6 schematically and partially shows an embodiment of the embedded subscriber identification module 506 of the device 500 of FIG. 5.

According to this embodiment, the first interface 508A (ISO_IN), the second interface 508B (ISO_OUT), the communication module 510, and the switching circuit 512 of embedded subscriber identification module 506 are similar, respectively, to the first interface 308A, to the second interface 308B, to the communication module 310, and to the switching circuit 312 of the embedded subscriber identification module 306 of FIG. 4.

According to this embodiment, the pads 402A, 404A, and 406A of first interface 508A are intended to be coupled, preferably connected, to pads (not shown) of modem 502 (FIG. 5). The pads 402C, 404C, and 406C of second interface 508C are intended to be coupled, preferably connected, to pads (not shown) of a housing or location (not shown) intended to receive SIM card 310C (FIG. 5).

Embedded subscriber identification module 506 for example comprises a block 602 (ROUTING ANALYSIS) for analyzing and routing data transmitted by modem 502 (FIG. 5), for example, during a communication of device 500 with another device (not shown). Block 602 is more particularly configured to analyze whether the data transmitted by modem 502 are intended for module 510A or SIM card 310C. According to the result of this analysis, block 602 changes the state of the bit eSIM_CFG stored by the register of memory 420 (REG-eSIM_CFG) to direct or redirect the data either towards module 510A, or towards SIM card 310C.

The functionalities of block 602 are for example implemented by software executed by a microcontroller of embedded subscriber identification module 506. When device 500 (FIG. 5), initially in standby mode, starts receiving data transmitted by modem 502, this for example causes the leaving of the standby mode and a redistribution of the communications towards module 510A or towards SIM card 310C.

As a variant, the functionalities of block 602 are executed by a wired logic circuit or a state machine of embedded subscriber identification module 506. This has the advantage of avoiding to have device 500 (FIG. 5) leave the standby mode each time a communication is received, and thus of sparing the power consumed by device 500.

In practice, embedded subscriber identification module 506 comprises a module (not shown) for demultiplexing the signals transmitted by modem 502 over link 514A. Embedded subscriber identification module 506 further comprises a module (not shown) for multiplexing the signals to be transmitted to modem 502 over link 514A.

Figure 7:
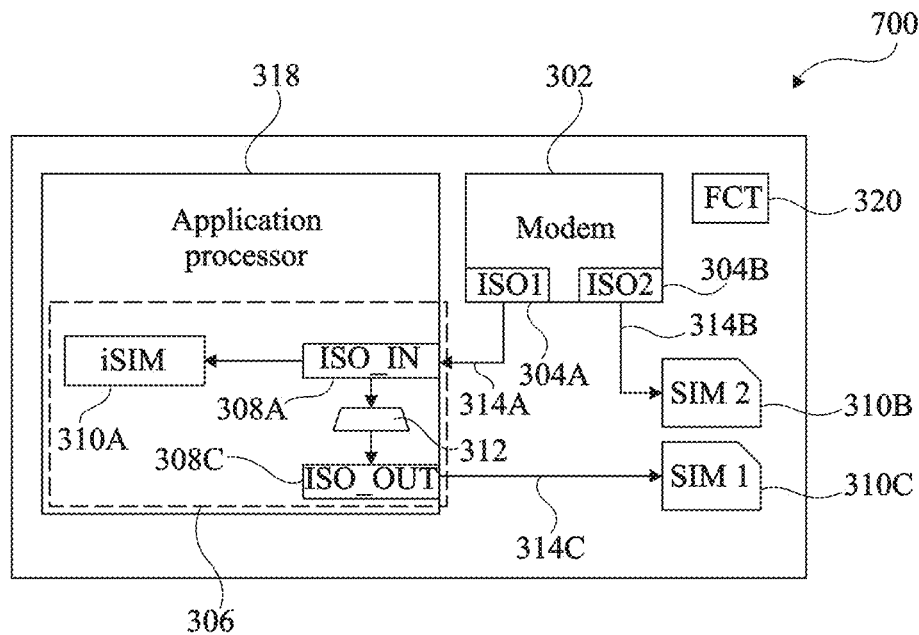
FIG. 7 schematically shows in the form of blocks an embodiment of an electronic radio frequency communication device comprising an embedded subscriber identification module.

FIG. 7 schematically shows in the form of blocks an embodiment of an electronic radio frequency communication device 700.

The device 700 of FIG. 7 comprises elements common with the device 300 of FIG. 3. The common elements will not be detailed again hereafter.

The device 700 of FIG. 7 differs from the device 300 of FIG. 3 mainly in that, in device 700, subscriber identification module 306 is an integrated subscriber identity module (iSIM). The integrated subscriber identity module 306 of device 700 for example forms part of microprocessor 318 (Application processor). Microprocessor 318 for example has an architecture of system-on-chip type (SoC).

More particularly, according to an embodiment, communication module 310A (iSIM), switching circuit 312, and communication interfaces 308A (ISO_IN) and 308C (ISO_OUT) are integrated to microprocessor 318. In practice, the module 310A of device 700 is for example programmed in a secure circuit integrated to microprocessor 318.

Device 700 has functionalities and advantages similar to those of device 300 (FIG. 3). Device 700 particularly provides the possibility of communicating by using either SIM card 310C (SIM 1) or the communication module 310A of integrated subscriber identification module 306. Device 700 further has decreased dimensions with respect to a device comprising an embedded subscriber identification module physically dissociated from microprocessor 318.

As a variant, SIM card 310C is replaced with an embedded subscriber identification module coupled, preferably connected, to the interface 308C of module 306 over link 314C. In this case, the embedded subscriber identification module is an electronic chip welded to a printed circuit board of device 700, for example, the electronic board receiving microprocessor 318.

Although this has not been shown in FIG. 7, device 700 may comprise a near-field communication module similar to the module 316 of device 300.

Figure 8:
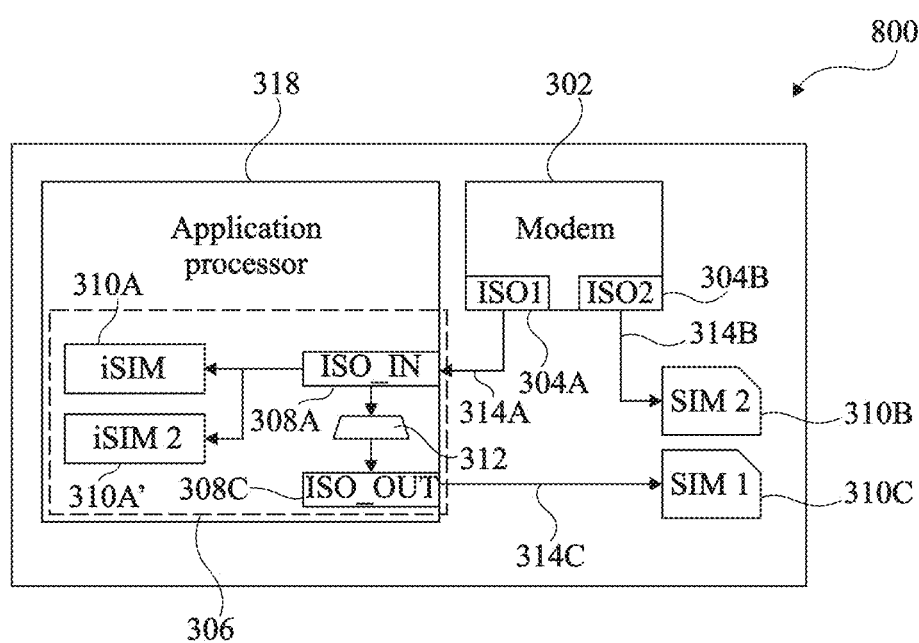
FIG. 8 schematically shows in the form of blocks another embodiment of an electronic radio frequency communication device comprising an embedded subscriber identification module.

FIG. 8 very schematically shows in the form of blocks another embodiment of an electronic radio frequency communication device 800.

The device 800 of FIG. 8 comprises elements common with the device 700 of FIG. 7. The common elements will not be detailed again hereafter.

The device 800 of FIG. 8 differs from the device 700 of FIG. 7 mainly in that device 800 comprises, in addition to module 310A (iSIM), another module 310A' (iSIM 2) integrated to microprocessor 318 (Application processor). In practice, modules 310A and 310A' for example correspond to two subscriber identification profiles programmed in the integrated subscriber identification module 306 of device 800. In this case, the modem 302 (Modem) of device 800 is for example capable of encoding over link 314A communications intended for subscriber profiles 310A and 310A'. The modem 302 of device 800 for example has functionalities similar to those of the modem 502 of device 500 (FIG. 5). In other words, the modem 302 of device 800 is a MEP modem.

Device 800 enables to communicate by using, in addition to SIM card 310B (SIM 2), either SIM card 310C (SIM 1), or the communication modules 310A and 310A' of integrated subscriber identification module 306. In other words, device 800 may use, to communicate, either the two physical SIM cards 310B and 310C, or the physical SIM card 310B and the two profiles 310A and 310A' programmed in integrated subscriber identification module 306. In the case where SIM card 310B and profiles 310A and 310A' are used, a total of three subscriber identification profiles are available.

Figure 9:
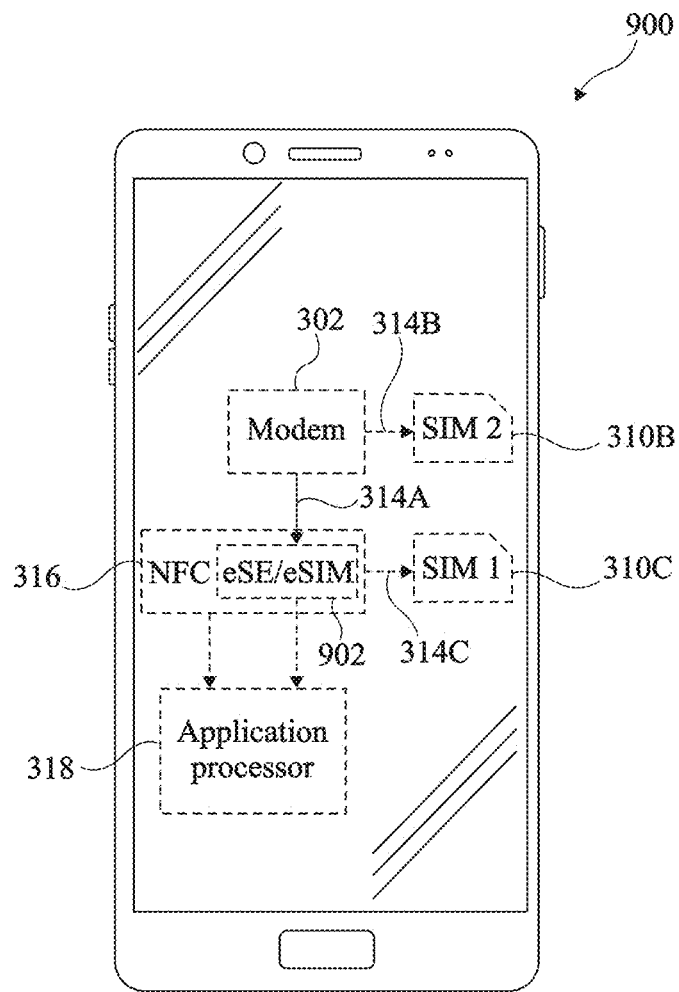
FIG. 9 shows a cell phone integrating a radio frequency communication circuit comprising an embedded subscriber identification module.

FIG. 9 shows a cell phone 900 integrating a radio frequency communication circuit comprising an embedded subscriber identification module. More particularly, FIG. 9 shows an example of implantation of the embodiment discussed in relation with FIG. 3.

In the shown example, the embedded subscriber identification module (not shown) is integrated to a secure module 902 (eSE/eSIM) of the near-field communication module 316 of cell phone 900. This particularly allows a space gain within cell phone 900.

Due to the embedded subscriber identification module integrated to module 902, telephone 900 may, according to the needs of a manufacturer and/or of a user of phone 900, be used with the two physical SIM cards 310B and 310C, or with physical SIM card 310B and a subscriber identification profile programmed in module 902. This thus provides cell phone 900 with a great flexibility of use.

Various embodiments, implementation modes, and variations have been described. Those skilled in the art will understand that certain features of these various embodiments, implementation modes, and variants, may be combined and other variants will occur to those skilled in the art. In particular, the previously-discussed embodiments and implementation modes are not limited to the described numbers of SIM cards and of modems and can be transposed by those skilled in the art to devices comprising any number of SIM cards and of modems.

Finally, the practical implementation of the described embodiments and variants is within the abilities of those skilled in the art based on the functional indications given hereinabove. In particular, other switching circuits may be provided by those skilled in the art to obtain the functionalities described in the above embodiments and implementation modes.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A subscriber identification module comprising:
a first communication interface, comprising first pads configured to be coupled to a modulator-demodulator circuit;
a second communication interface, comprising second pads configured to be coupled to a subscriber identification module card; and
a switching circuit, configured to:
selectively couple the first pads to the second pads; and
selectively couple the first pads to a communication module integrated in the subscriber identification module.

2. The module according to claim 1, wherein the subscriber identification module further comprises a non-volatile memory, and wherein the switching circuit is controlled according to a state of a bit of a register of the memory.

3. The module according to claim 1, wherein the switching circuit comprises an analysis and routing module, configured to analyze and redirect signals received by the first communication interface of the subscriber identification module.

4. The module according to claim 1, wherein each of the first and second interfaces is selected from among:
a standardized ISO 7816 interface;
an I2C interface;
an I3C interface; or
an SPI series interface.

5. A method of controlling a subscriber identification module, the subscriber identification module comprising a first communication interface including first pads coupled to a modulator-demodulator circuit, and a second communication interface including second pads coupled to a subscriber identification module card, the method comprising:
selectively coupling, by a switching circuit, the first pads to the second pads; and
selectively coupling, by the switching circuit, the first pads to a communication module integrated in the subscriber identification module.

6. The method according to claim 5, wherein the subscriber identification module further comprises a non-volatile memory, and the method further comprises controlling the switching circuit according to a state of a bit of a register of the memory.

7. The method according to claim 5, further comprising:
receiving, by the first communication interface of the subscriber identification module, signals; and
analyzing and redirecting, by an analysis and routing module, the signals.

8. The method according to claim 5, further comprising selecting each of the first and second interfaces from among:
a standardized ISO 7816 interface;
an I2C interface;
an I3C interface; or
an SPI series interface.

9. An electronic device comprising:
a subscriber identification module comprising:
a first communication interface, comprising first pads configured to be coupled to a modulator-demodulator circuit;
a second communication interface, comprising second pads configured to be coupled to a subscriber identification module card; and
a switching circuit, configured to:
selectively couple the first pads to the second pads; and
selectively couple the first pads to a communication module integrated in the subscriber identification module;
the modulator-demodulator circuit; and
a first location configured to receive a first subscriber identification module card.

10. The device according to claim 9, wherein the subscriber identification module is an embedded subscriber identification module.

11. The device according to claim 9, wherein the subscriber identification module is part of a near-field communication module of the device.

12. The device according to claim 11, wherein the subscriber identification module is integrated in a secure module of the near-field communication module of the device.

13. The device according to claim 9, further comprising a system-on-chip microprocessor, wherein the subscriber identification module is integrated in the microprocessor.

14. The device according to claim 13, further comprising a second subscriber identification module integrated in the microprocessor.

15. The device according to claim 9, wherein:
the modulator-demodulator circuit comprises a third communication interface, comprising third pads coupled to the first pads of the first communication interface of the subscriber identification module; and
the first location comprises a fourth communication interface, comprising fourth pads coupled to the second pads of the second communication interface of the subscriber identification module.

16. The device according to claim 15, wherein the modulator-demodulator circuit further comprises a fifth communication interface, comprising fifth pads coupled to sixth pads of a sixth communication interface of a second location intended to receive a second subscriber identification module card.

17. The device according to claim 9, wherein the subscriber identification module further comprises a non-volatile memory, and wherein the switching circuit is controlled according to a state of a bit of a register of the memory.

18. The device according to claim 9, wherein the switching circuit comprises an analysis and routing module, configured to analyze and redirect signals received by the first communication interface of the subscriber identification module.

19. The device according to claim 9, wherein each of the first and second interfaces is selected from among:
a standardized ISO 7816 interface;
an I2C interface;
an I3C interface; or
an SPI series interface.

20. The device according to claim 9, wherein the device is a cell phone.

* * * * *